(12) United States Patent
Lee

(10) Patent No.: US 11,484,903 B2
(45) Date of Patent: Nov. 1, 2022

(54) APPARATUS FOR WITHDRAWING SPRAYED PAINT AND WITHDRAWAL PLATE SUITABLE THEREFOR

(71) Applicant: Myoung Jong Lee, Seoul (KR)

(72) Inventor: Myoung Jong Lee, Seoul (KR)

( * ) Notice: Subject to any disclaimer, the term of this patent is extended or adjusted under 35 U.S.C. 154(b) by 0 days.

(21) Appl. No.: 17/324,210

(22) Filed: May 19, 2021

(65) Prior Publication Data
US 2022/0023906 A1     Jan. 27, 2022

(30) Foreign Application Priority Data
Jul. 23, 2020     (KR) .................. 10-2020-0091728

(51) Int. Cl.
*B05B 14/44*     (2018.01)
*B05B 16/40*     (2018.01)

(52) U.S. Cl.
CPC .............. *B05B 14/44* (2018.02); *B05B 16/40* (2018.02)

(58) Field of Classification Search
CPC .................................................. B01D 46/121
See application file for complete search history.

(56) References Cited

U.S. PATENT DOCUMENTS

| | | | | |
|---|---|---|---|---|
| 3,287,870 A | * | 11/1966 | Johnson ................. | E06B 7/082 52/473 |
| 2010/0015904 A1 | * | 1/2010 | Yeh .................... | B01D 46/0005 55/511 |

* cited by examiner

*Primary Examiner* — Charles Capozzi
(74) *Attorney, Agent, or Firm* — Sughrue Mion, PLLC

(57) ABSTRACT

The present invention relates to a withdrawal plate suitable for an apparatus for withdrawing a sprayed paint to solve a failure of a painting facility and a contamination problem due to paint sludge, which includes: a square frame constituted by left and right side frames 91, an upper frame 92, and a base frame 93; and slats 94 arranged at a predetermined interval within the square frame, in which the left and right side frames 91 facing each other are included in one direction, and the slat 94 is fixed the left and right side frames 91 in an oblique state so that a front is lifted up and moves down backwards when viewed from the side, and multiple slats are consecutively arranged at a predetermined interval in a vertical direction.

2 Claims, 13 Drawing Sheets

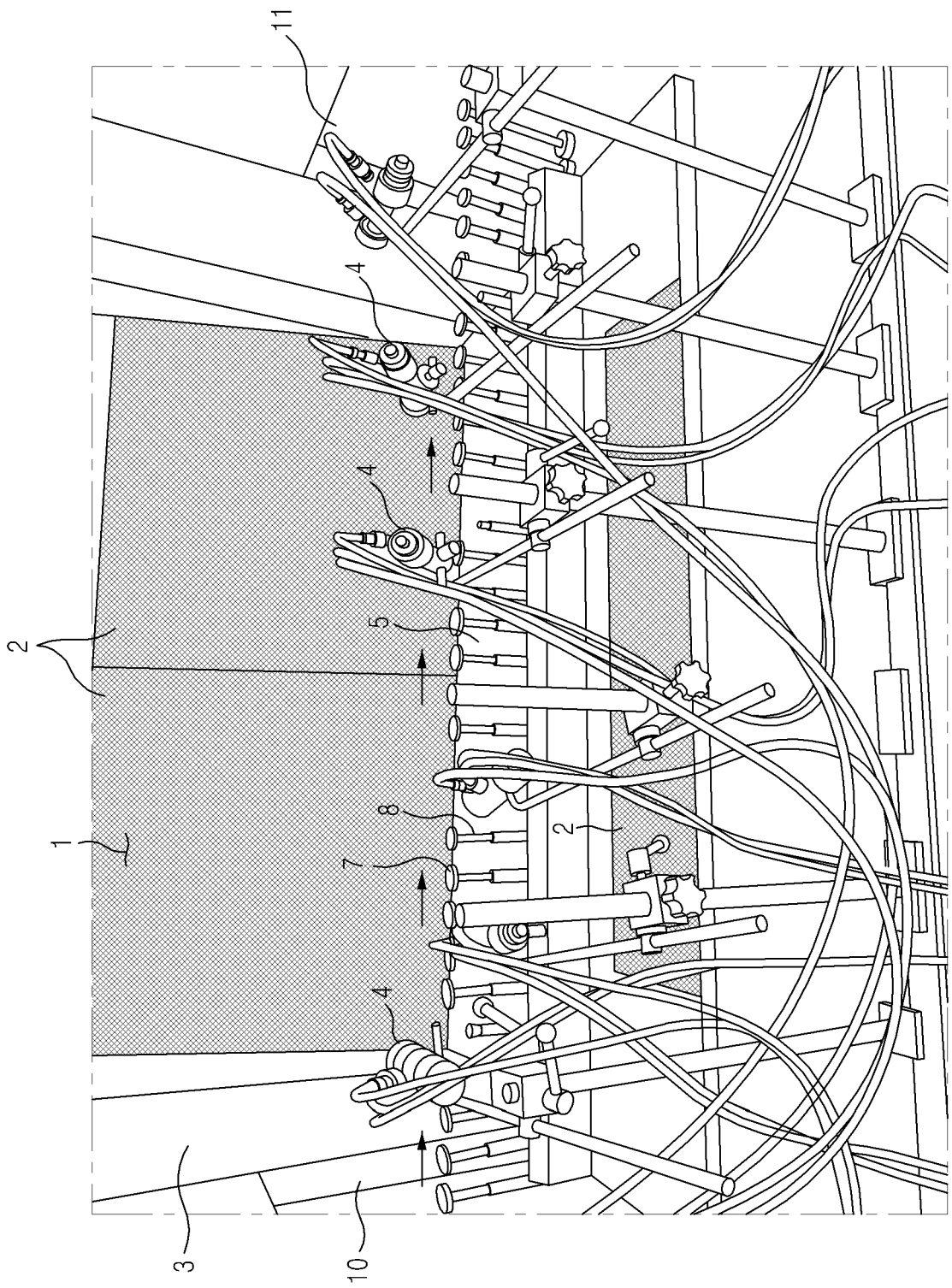
[FIG. 1]

[FIG. 2]
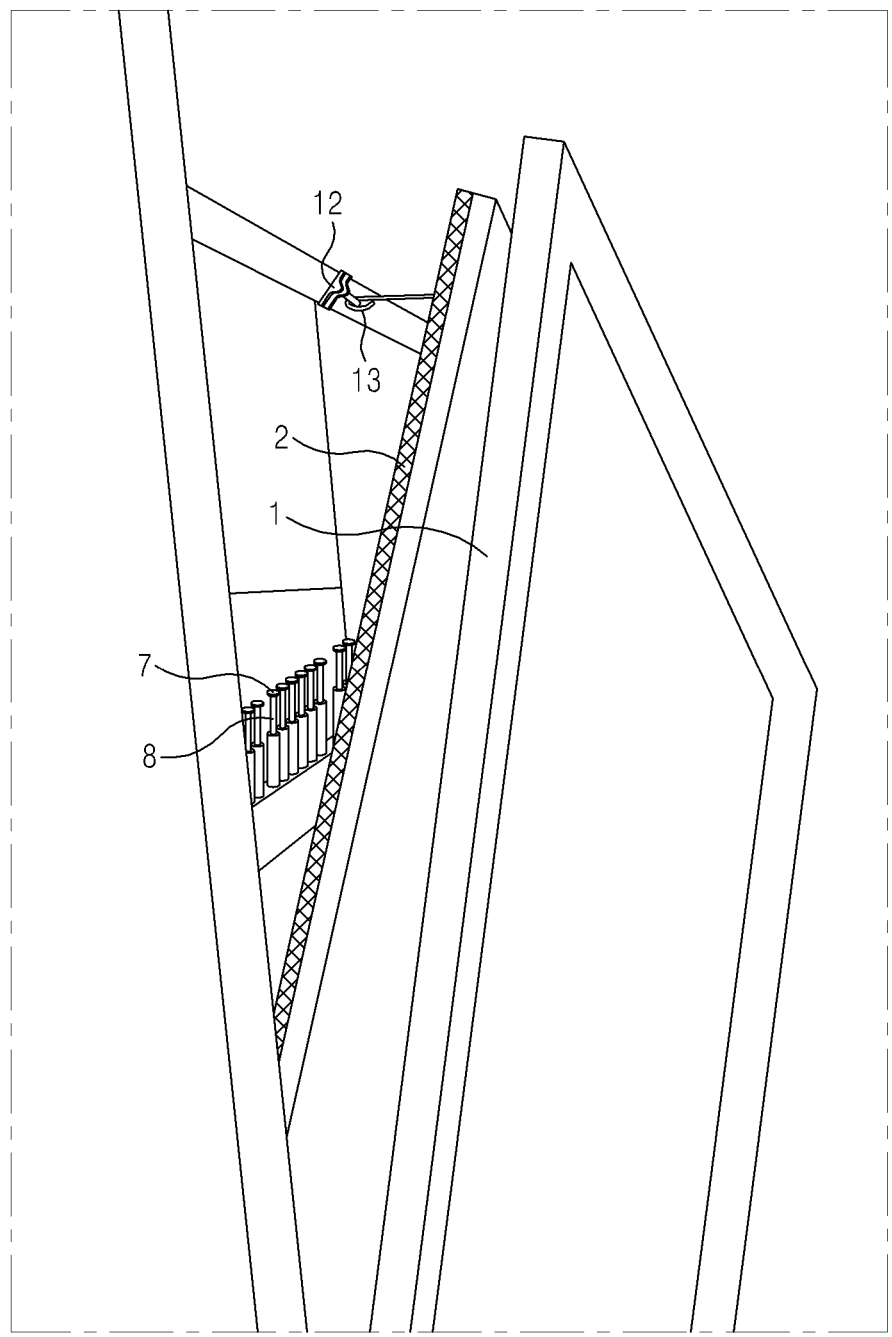

[FIG. 3]
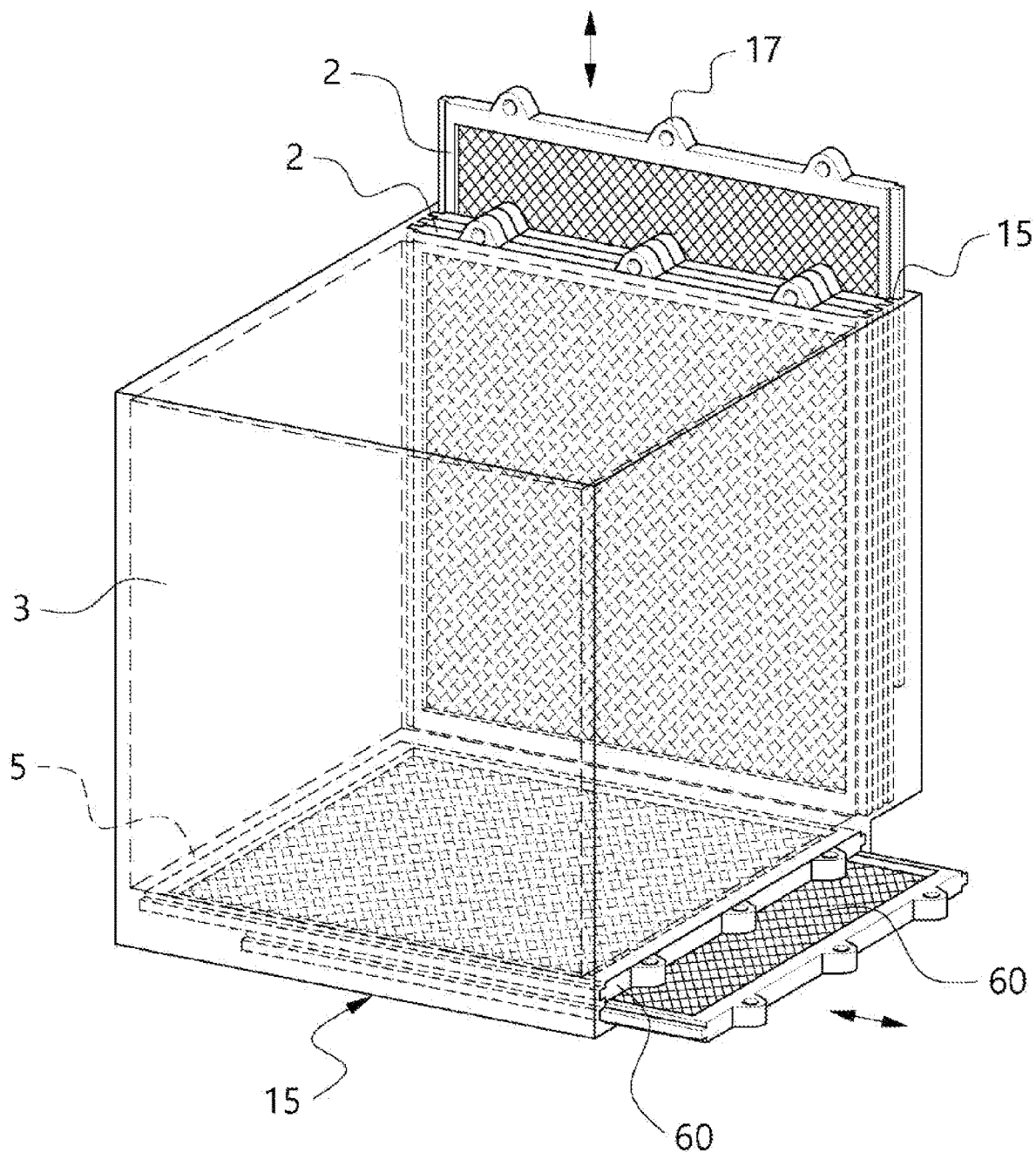

[FIG. 4A]
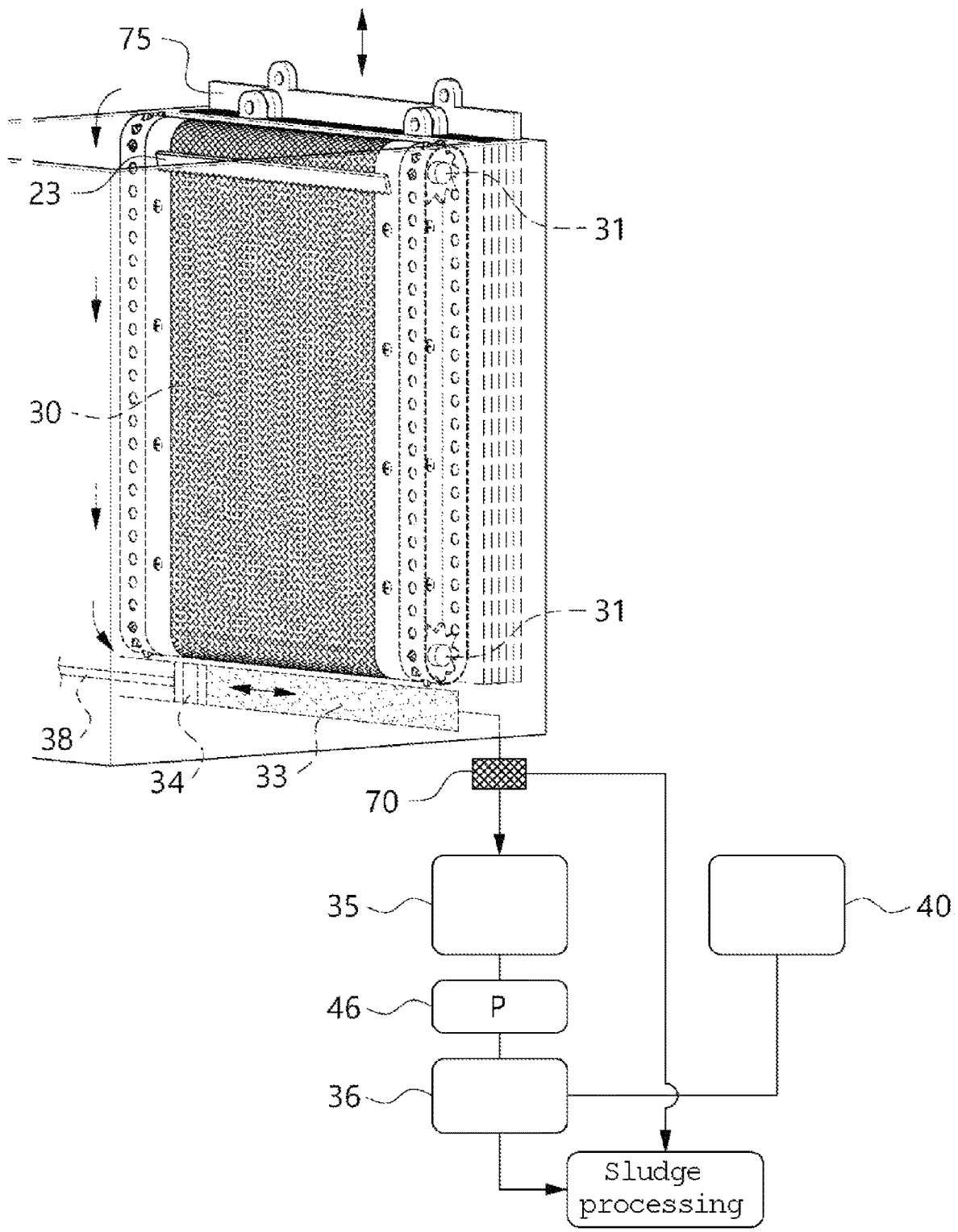

[FIG. 4B]
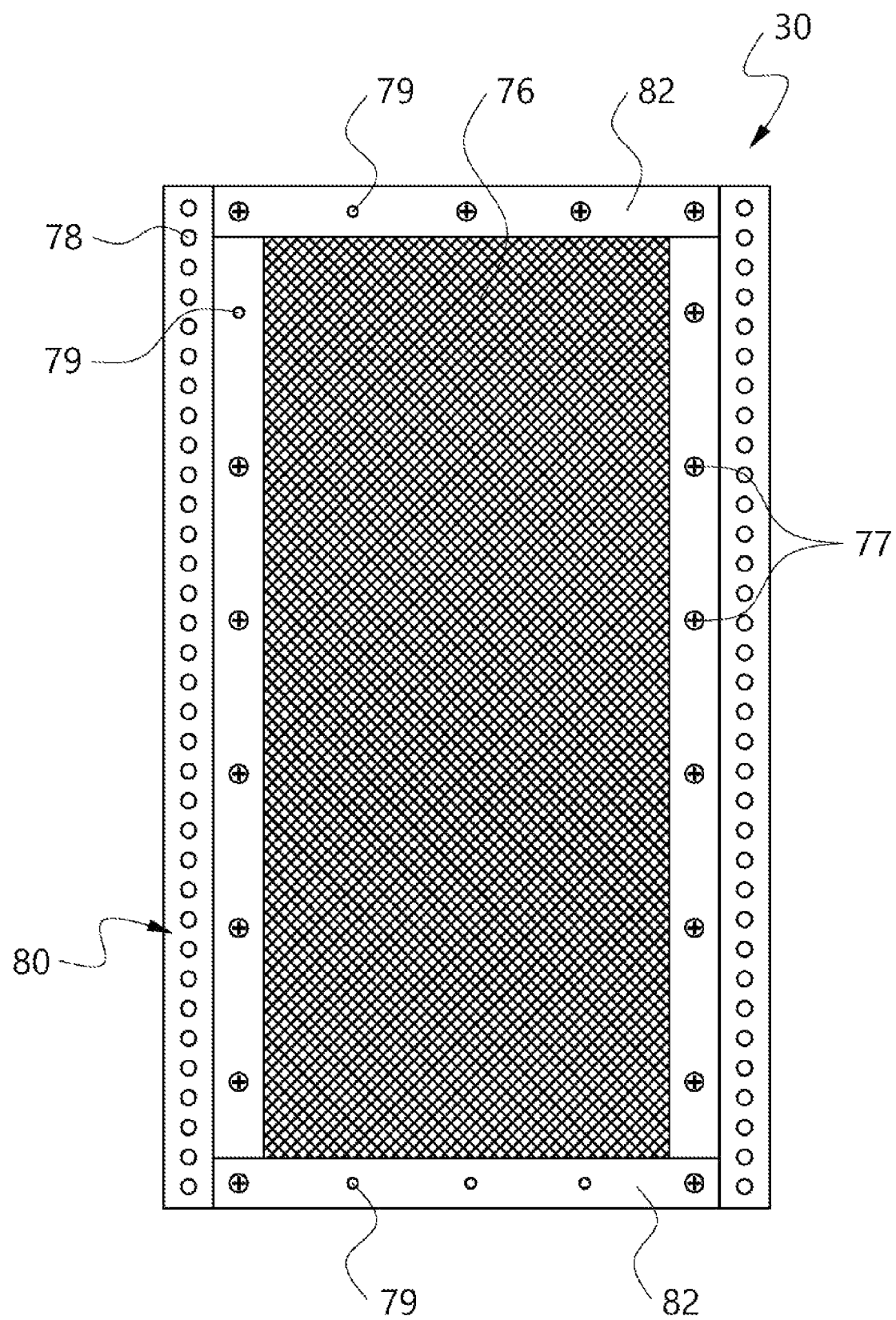

[FIG. 5]
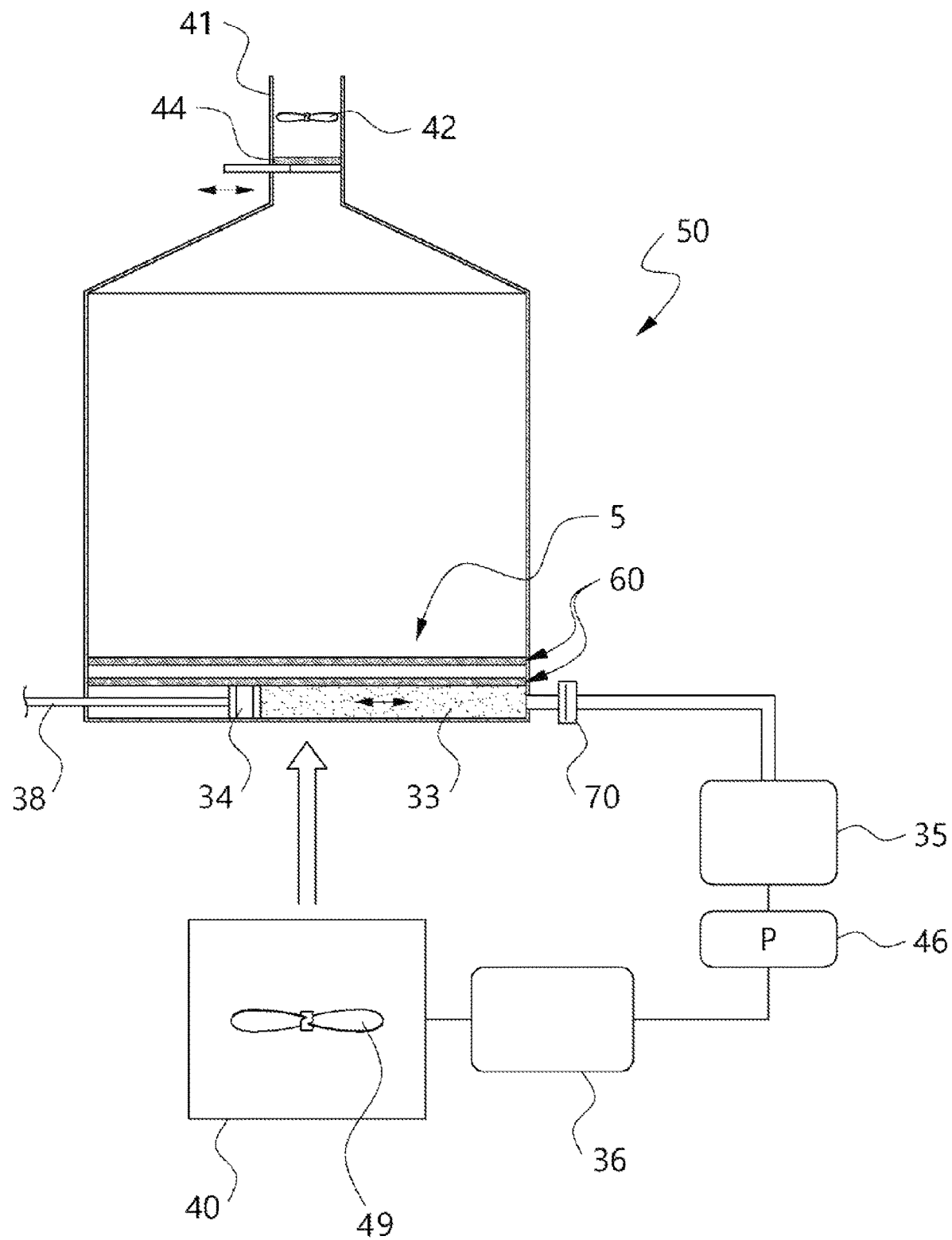

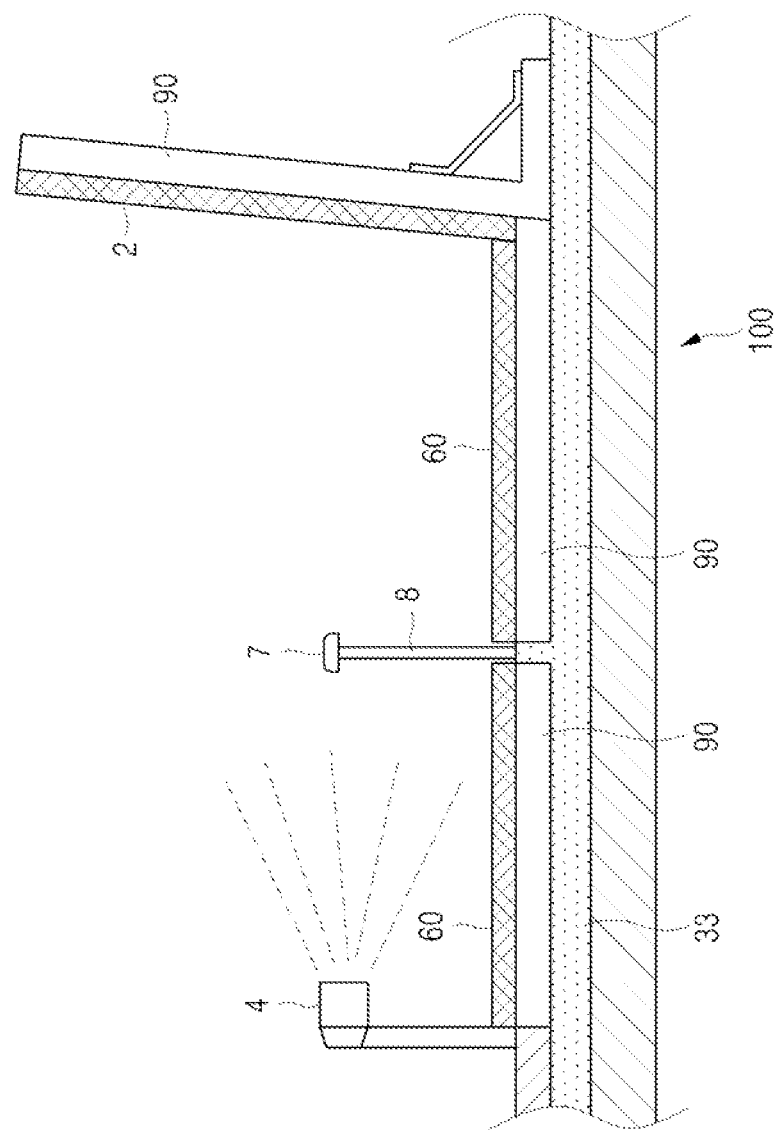
[FIG. 6]

[FIG. 7]
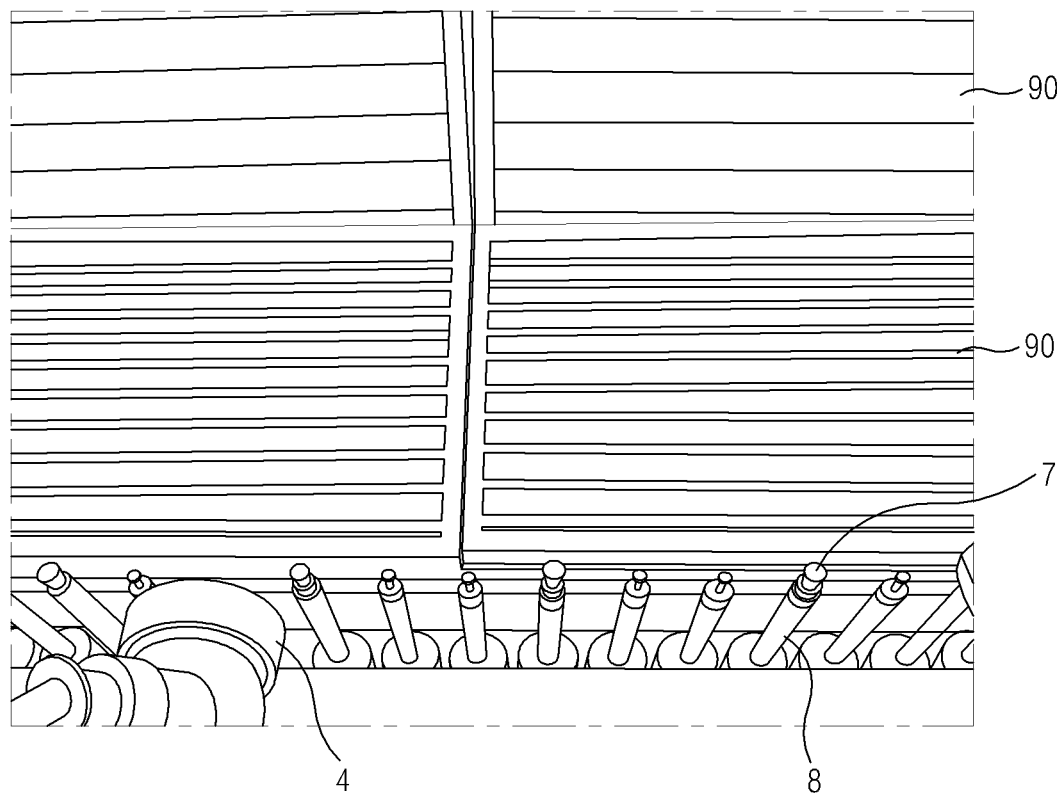

[FIG. 8A]
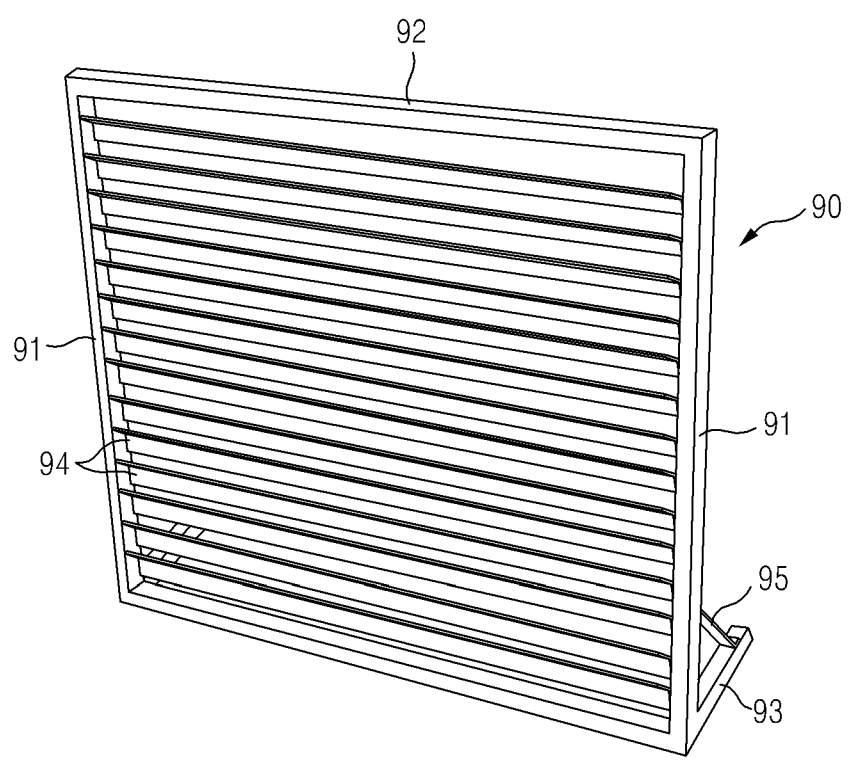

[FIG. 8B]
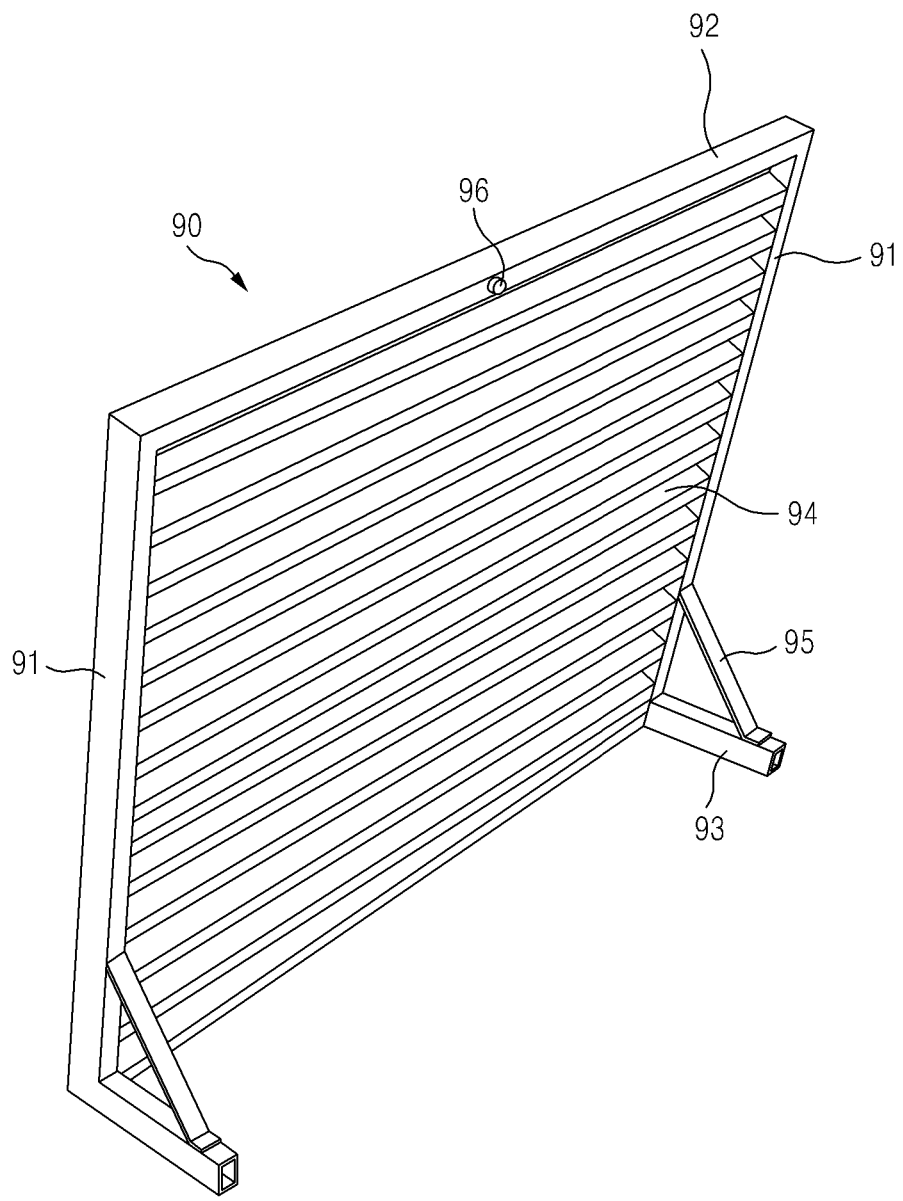

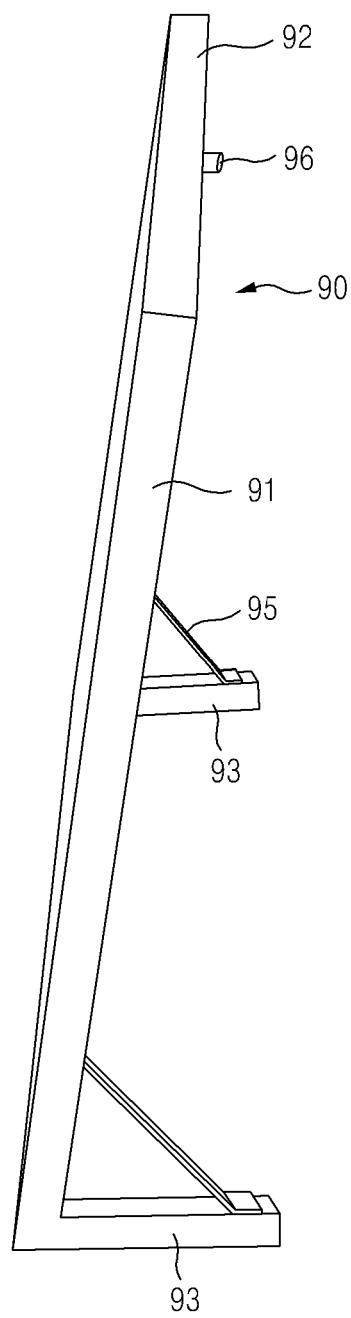
[FIG. 8C]

[FIG. 9]
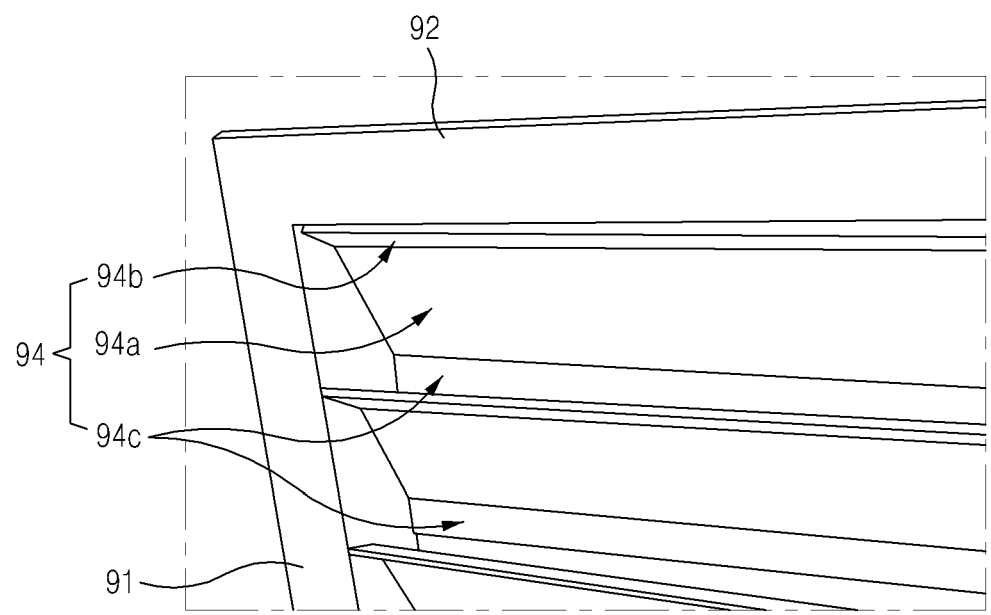

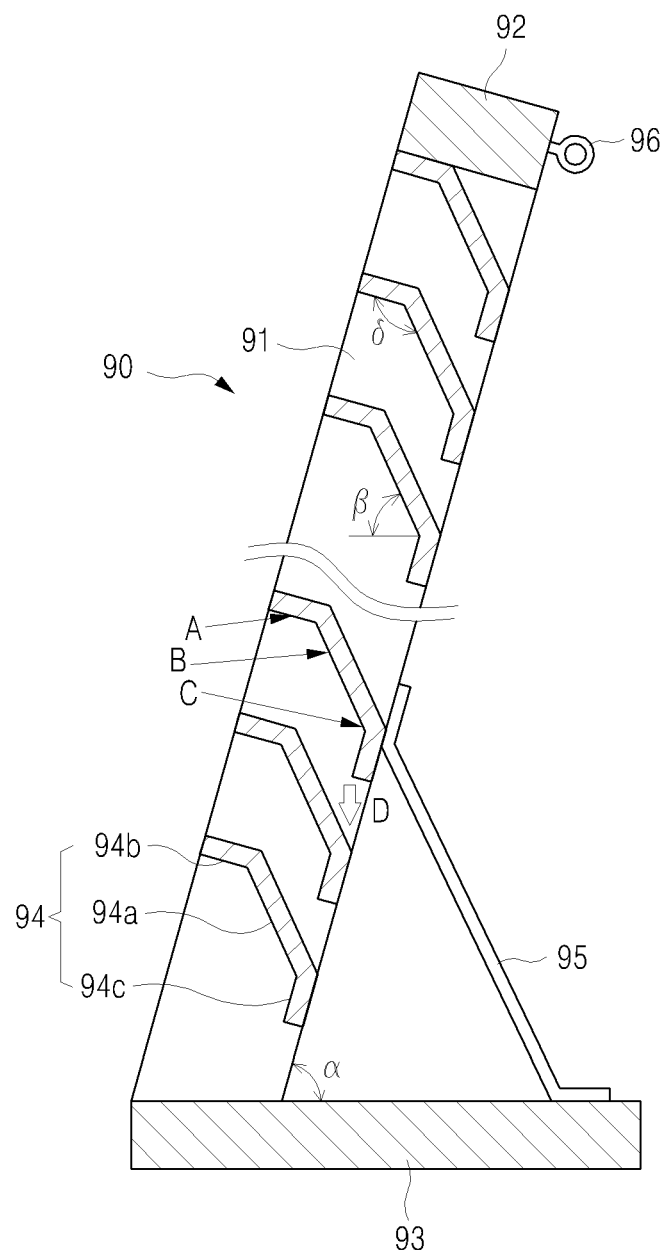
[FIG. 10]

APPARATUS FOR WITHDRAWING SPRAYED PAINT AND WITHDRAWAL PLATE SUITABLE THEREFOR

CROSS-REFERENCE TO RELATED APPLICATIONS

This application claims the priority of Korean Patent Application No. 10-2020-0091728 filed on Jul. 23, 2020, in the Korean Intellectual Property Office, the disclosure of which is incorporated herein by reference.

BACKGROUND OF THE INVENTION

Field of the Invention

The present invention relates to an apparatus for withdrawing a sprayed paint, which can withdraw a paint by spraying the paint in a painting booth for painting coating on a product surface, in particular, a small article, for example, a lid of a cosmetic container, and reutilize the withdrawn paint prevent air pollution and surrounding contamination, and a withdrawal plate suitable therefor.

Description of the Related Art

In a painting booth, when spray painting on an outer surface of a predetermined article, for example, in a process of spraying a painting paint on the outer surface of a product such as a lid of a container, a conventional painting booth is installed on the bottom of the booth and painting is performed while spraying water on the top. In this case, surrounding external and air pollution should be prevented by particularly spraying the water from the top in order to prevent the sprayed paint from being scattered.

In this case, the water and a sprayed dust state paint are mixed to fall to the bottom, resulting in a sludge, which causes a malfunction of a circulating pump, etc. Further, in the case of the sludge of the mixture of the paint and the water, it is difficult to treat contaminated water, large processing cost is generated, and the sludge is intractable. In addition, the water-paint mixture sludge is sticky and thus hardened in a form like rice cake, and as a result, it is difficult to treat the sludge, resulting in suffering a difficulty in maintenance of a facility and taking a lot of time for the maintenance and causing facility maintenance cost to increase.

Further, in the conventional case, as a sprayed paint material is attached to an inner wall of the booth, it is very difficult to clean the sprayed paint material and an operation of the facility should be stopped, so there is a problem that productivity is lowered.

SUMMARY OF THE INVENTION

The present invention is contrived to solve the conventional problems, and an object of the present invention is to reduce paint material cost and does not need a used water supply device by withdrawing and reutilizing a paint discarded without using water, and reduce facility cost, and operation maintenance cost due to not using the water.

Further, an object of the present invention is to provide an apparatus for withdrawing a sprayed paint and a withdrawal plate suitable therefor, which can remove a cause of a malfunction which occurs in throughout a painting facility due to a sludge generated by a mixture of water and a sprayed dust state paint, and resolve a contamination water treatment problem due to a painting dust and water mixture and reduce contamination water treatment facility cost and contamination water treatment cost, and resolve a problem of environmental contamination.

In order to solve the problem, according to an aspect of the present invention, a withdrawal plate 90 used for an apparatus for withdrawing a sprayed paint includes: a square frame constituted by left and right side frames 91, an upper frame 92, and a base frame 93; and slats 94 arranged at a predetermined interval within the square frame, in which the left and right side frames 91 facing each other are included in one direction, and the slat 94 is fixed the left and right side frames 91 in an oblique state so that a front is lifted up and moves down backwards when viewed from the side, and multiple slats are consecutively arranged at a predetermined interval in a vertical direction.

Preferably, the slat 94 has a form including an upper blade 94b and a lower blade 94c extended to upper and lower sides of a long plate-shaped slat body 94a while forming a predetermined obtuse angle.

More preferably, the slat 94 has a form of "]".

In order to solve the problem, according to another aspect of the present invention, in an apparatus for withdrawing a paint, the withdrawal plate 94 is disposed on a front wall 1.

Preferably, the withdrawal plate 94 is disposed even on a side wall 3 and a bottom 5, and an inside of the withdrawal plate 94 is patched with a metal-net filter plate 2.

According to the present invention, paint material cost is reduced and a used water supply device is not required by withdrawing and reutilizing a paint discarded without using water to reduce facility cost, and operation maintenance cost due to not using the water.

Further, according to the present invention, it is possible to remove a cause of a malfunction which occurs in throughout a painting facility due to a sludge generated by a mixture of water and a sprayed dust state paint, and resolve a contamination water treatment problem due to a painting dust and water mixture and reduce contamination water treatment facility cost and contamination water treatment cost, and resolve a problem of environmental contamination.

Further, according to the present invention, maintenance of the painting facility is simple and maintenance cost is small, and contaminants generated after painting are significantly reduced and an environmental facility is possible.

Further, in the present invention, a filter plate 2 itself is modularized into one assembly so as to be replaced with another clean filter plate by lifting and removing the filter plate 2 from the top to rapidly perform a replacement operation of the filter plate 2, thereby enhancing productivity.

Further, according to the present invention, a dust collecting facility becomes smaller to be installed in a narrow space and initial investment cost is also small.

Further, fine dust can be reduced further than the related art, thereby reducing odor in a workplace. The reason is that a filter plate having a metal net structure approaches and collects contaminants generated after spray painting, and discharge the contaminants to the outside of the workplace.

In particular, in addition the metal net filter plate, a withdrawal plate capable of effectively withdrawing the spayed pint while additionally reducing dust generation is dually installed to show a further increased withdrawal effect.

In addition to the above object and effect, other objects and advantages of the present invention will be clearly revealed through the detailed description of the embodiments referenced in the accompanying drawings.

BRIEF DESCRIPTION OF THE DRAWINGS

The above and other aspects, features and other advantages of the present invention will be more clearly understood from the following detailed description taken in conjunction with the accompanying drawings, in which:

FIG. 1 illustrates one embodiment of a painting booth according to a previously filed invention;

FIG. 2 is a diagram illustrating a state in which a front wall 1 portion of the painting booth is bent back and opened;

FIG. 3 is a configuration diagram of installation of a filter plate in a booth according to the previously filed invention;

FIG. 4A illustrates another exemplary embodiment of FIG. 3;

FIG. 4B is a diagram for describing a configuration example for a rotating filter plate 30;

FIG. 5 is a diagram illustrating a withdrawal circulation apparatus of sludge and an exhaust;

FIG. 6 is a schematic diagram of a paint withdrawal apparatus according to the present invention;

FIG. 7 is a photograph showing installation of a withdrawal plate of a paint withdrawal apparatus according to the present invention;

FIGS. 8A to 8C are photographs showing the withdrawal plate of the paint withdrawal apparatus according to the present invention;

FIG. 9 is a partial enlarged photograph of the withdrawal plate of the paint withdrawal apparatus according to the present invention; and FIG. 10 is a cross-sectional view of the withdrawal plate of the paint withdrawal apparatus according to the present invention.

DETAILED DESCRIPTION OF THE PREFERRED EMBODIMENT

Hereinafter, the present invention will be additionally described together with the accompanying drawings.

First, the present inventor has filed another Korean patent application No. 10-2019-0128050 having a title of "Painting Booth Being Possible to Reutilize by Withdrawing of Sprayed Paint" on Oct. 15, 2019, relating to the present invention, and the contents of the invention which was previously filed (hereinafter, referred to as a 'previously filed invention') constitute a part of a specification of the present application as they are.

('Previously Filed Invention')

First, with reference to FIGS. 1 to 5, the inventor's 'previously filed invention' related to the present invention will be described in detail.

FIG. 1 illustrates one embodiment of a painting booth according to a previously filed invention, FIG. 2 is a diagram illustrating a state in which a front wall 1 portion of the painting booth is bent back and opened, and FIG. 3 is a configuration diagram of installation of a filter plate in a booth according to the previously filed invention. FIG. 4A illustrates another exemplary embodiment of FIG. 3, FIG. 4B is a diagram for describing a configuration example fora rotating filter plate 30, and FIG. 5 is a diagram illustrating a withdrawal circulation apparatus of sludge and an exhaust;

As illustrated in FIG. 1, a metal net filter plate 2 is installed on the front wall 1. It is preferable that only one filter plate 2 is not installed, but several filter plates 2 are installed. A reason for using the metal net filter without installing a simple flat plate is that if a point mist sprayed by a nozzle hits the flat plate, a spray liquid is re-reflected and attached to a surface of a product to be applied, resulting in a product defect. When an iron net is used, the paint mist reflected by spraying is not generated, but the paint mist is attached or attached to an iron net located in the rear by passing through holes of the iron net. The filter plate 2 may also be installed on left and right side walls 3 in a booth. In addition, the filter plate 2 is also installed on a bottom 5. In particular, the metal filter plate 2 is also installed below the paint spray nozzle 4.

For reference, an operation of applying the paint to caps of various containers of cosmetics, etc., is described below with reference to FIG. 1.

A cap 7 is installed on the top of a rotation shaft 8, and enters a left inlet 10 along a rail while rotating and moves a right outlet 11 of the painting booth. In this case, two paint spray nozzles 4 installed at the left side spray the paint horizontally and three nozzles 4 at the right side sprays the paint from the top to the bottom a little slantly. Then, the paint is evenly sprayed to the surface of the rotating cap 7.

In this case, the sprayed painted paint is scattered in a fine dust form and the most scattered paint is attached to the front wall 1 by a spray pressure of the nozzle. In addition, scattered dust type paint is scattered and attached to the top, and the left and right side walls, and when the time elapses, the paint attached to the walls flows down and falls to the bottom.

Therefore, in the previously filed invention, a largest number of filter plates 2 are installed in multiple layers on the front wall 1 and at least one metal net filter plate 2 is also installed on the side wall and the bottom 5.

There are various sprayed paints. For example, since a UV paint is high in fluidity, the UV paint flows down, but is temporally solidified. Urethane and acrylic paints, for example, urethane and acrylic paints (2 liquid type paint) are dried, the urethane and acrylic paints easily become a power type. That is, since the urethane and acrylic paints are low in fluidity, the urethane and acrylic paints do not flow down and are thus adhered and attached to the wall surface.

FIG. 2 is a diagram illustrating the front wall 1 from the rear.

As illustrated, the front wall 1 has a hinge (not illustrated) on the bottom and is configured to be opened in an opening/closing type. A ring 13 is connected to the top of the front wall 1 and hung on a latch 12 to configured to perform a replacement operation of the filter plate 2.

A separated filter plate 2 is washed with being immersed in thinner or washed being sprayed with the thinner. A paint solidified temporally long in or attached in a sludge form to the filter plate 2 is easily washed when caustic soda is boiled, and the filter plate 2 is immersed in the caustic soda and washed.

FIG. 3 is another exemplary embodiment of the previously filed invention.

As illustrated, in the exemplary embodiment, the filter plate 2 is installed in several sheets, preferably, up to 10 sheets in a storage drawer scheme. That is, the filter plate 2 itself is modularized into one assembly so that the filter plate 2 is lifted from the top and removed on the top of the front wall and replaced with another clean filter plate 2. In addition, when a separated storage frame 15 for storing the filter plate 2 is installed and inserted into the storage frame 15, the filter plate 2 is easily replaced. Therefore, a replacement operation time of the filter plate 2 is shortened to increase productivity.

Since a frontmost filter plate 2 has the highest contamination degree, the filter plate 2 is frequently replaced and since a filter plate 2 which is installed farther back from the front is less contaminated, a replacement cycle is long.

Therefore, when only the frontmost filter plate 2 and one to three subsequent sheets are frequently replaced, a filter plate 2 which is installed in the rear thereof may be used for a long time, and as a result, replacement of the filter plate is efficiently performed and work efficiency is also enhanced. A hook portion 17 is formed on the top of the filter plate 2 so as to easily withdraw the filter plate 2 from the storage frame 15.

The filter plate 2 of such a configuration may also be configured on the left and right side walls 3. Since a lot of paint dust is not attached to the side wall 3, even though only approximately 3 filters 2 are installed, it is sufficient. Similarly to the filter plate 2 configured on the front wall 1, the storage frame 15 is installed, and the filter plate 2 is configured to be inserted into and removed from the storage frame 15. The filter plate 2 configured on the side wall 3 may be configured in any scheme like withdrawal from the top or the side.

A bottom filter plate 60 is also installed in the bottom 5, and approximately one to three sheets are also installed in the bottom and is installable in a storage type of a structure to withdraw the bottom filter plate to the side or in front and forth in a drawer scheme.

FIG. 4A illustrates another configuration example of the filter plate 2 illustrated in FIG. 3 (that is, illustrated on the front wall).

Since the filter plate 2 configured on the front wall has a high contamination degree and should be most frequently cleaned, the filter plate 2 is configured to be automatically cleaned. That is, a scrapper 23 is installed on the top, and a rotating filter plate 30 is configured in such a manner that the filter plate rotates while contacting the scrapper 23. The rotating filter plate 30 has sprockets 31 on both ends of left and right, and upper and lower sides for the rotation. The rotation of the rotating filter plate 30 may be configured to be continuously slowly performed or operated at a predetermined time interval. Meanwhile, when the interval is too long, the paint is solidified, so a reutilizing degree of the withdrawn paint is undesirably lower.

The rotation of the sprocket 31 may be configured to move forward and backward according to actuation of a motor or configured to rotate only in one direction. That is, the rotating filter plate 30 may be operated to move down from the top to the bottom or operated move up from the bottom to the top according to a forward/reverse direction of a motor (not illustrated). Several filter plates 2 of the above exemplary embodiment are installed in the rear of the rotating filter plate 30 and a cover 75 is selectively installed in a rearmost portion. Very small amount of paint dust is applied to the rearmost filter plate 2, and finally, not the filter but a cover 75 formed by a flat plate is installed in the rearmost portion to completely prevent the paint dust from being discharged to the outside of a booth box.

FIG. 4B illustrates a specific configuration example for the rotating filter plate 30.

A generally commercially available metal net 76 is prepared and a fixation strip 80 capable of fixing the metal net 76 is prepared. The fixation strip 80 has through-holes 78 which may engage with teeth of the sprocket 31 (illustrated in FIG. 4A) at an outermost side and holes which may fasten a coupling instrument 77 such as a screw, etc., inside the through-holes 78. Two fixation strips 80 overlap with ach other and the net 6 is inserted between two fixation strips 80 and are fastened by the screw, etc., through the coupling instrument 77. Both the left and right side are fastened. In addition, coupling plates 82 capable of both upper and lower ends are patched and assembled to both upper and lower ends of the net 76. When the coupling plates 82 assembled to both upper and lower ends of the net by suspending the prepared assembly to the sprocket 31 are patched to each other and coupled through fastening holes 79, mounting of the rotating filter plate 30 is completed.

Referring back to FIG. 4A, a piston 34 and a push rod 38 for discharging a liquid paint and a sludge 33 which fall by the scrapper 23 are installed on the bottom and the liquid paint and the sludge 33 pushed and discharged to one side by the piston 34 are collected to a collector 35 via a filter 70 and separately processed. In the collector 35, a liquid waste paint is withdrawn to a paint tank 40 via a circulation pump 46 and a second filter 36 and is circulated and reutilized in a booth in which a paint spray nozzle is installed, and a rice cake type sludge 33 filtered by a filter 36 is waste-processed. Through such a configuration, there is an advantage in that it is more convenient to clean the filter plate and the filter plate may be operated for a long time without cleaning and replacing the filter plate.

FIG. 5 is a diagram for describing an exhaust of a paint applying booth 50 and a paint circulating system in a lower portion. As illustrated, an exhaust duct 41 for exhaust is installed on the top of the booth 50 and inhalation by an exhaust fan 42 is made, and as a result, the paint dust is exhausted. In this case, an exhaust filter 44 is installed on the bottom of the exhaust duct 41 and dust particles are caught at any degree to prevent a worksite surrounding environment and atmospheric pollution. The exhaust filter 44 is also configured in the drawer scheme which may be inserted and withdrawn on the side to facilitate filter replacement.

Multiple layers of filter plates 2 are installed on the bottom 5 in a lower part of the booth 40 and the paint and sludge 33 which flow down are gathered below the filter plates 2. The paint and the sludge 33 are pushed to the side part by the piston 34 and pass through the filter 70 and the collector 35, and pass through the second filter 36 again and are withdrawn to the paint tank 40 by actuation of the circulation pump 46. An agitation fan 49 is installed in the paint tank 40, which well mixes the paint and the sludge 33 with the withdrawn paint and further prevents the paint from being solidified.

By such a configuration, as the water is not used, paint wastewater is not generated and the paint is enabled to be circulated and reused, a work environment becomes very clean, and the atmospheric pollution by the paint dust exhausted to the atmosphere is also prevented.

However, in the case of the previously filed invention, a problem that a paint mist sprayed by the nozzle hits and re-reflected on the flat plate may be solved to some extent, but the metal-net filter plate 2 may not perfectly solve the problem according to various spray strengths or angles of the sprayed paint, and as a result, the flat-plate cover (reference numeral 75 of FIG. 4A) should still be installed in the rear of the metal-net filter plate 2 and thus, the sprayed paint is reflected on the rear flat-plate cover 75 by passing through the metal-net filter plate 2 and then is misted again and moves up, so there is a limit in completely preventing dust generation and for this reason, multiple sheets of metal-net filter plates 2 should be used, resulting in a new problem that a thickness increases and there is a management difficulty.

Exemplary Embodiment of Present Invention

Therefore, the present inventor has invented a withdrawal plate 90 in which the withdrawal of the paint is also more effectively improved while minimizing the generation of the dust by improving the cover in the rear of the metal-net filter plate 2.

Now, subsidiarily referring to the previously filed invention, a paint withdrawal apparatus 100 and a withdrawal plate 90 for an optimal embodiment of the present invention will be described in detail with reference to FIGS. 6 to 10.

FIG. 6 is a schematic diagram of a paint withdrawal apparatus 100 according to the present invention, FIG. 7 is a photograph showing installation of a withdrawal plate of a paint withdrawal apparatus according to the present invention, FIGS. 8A to 8C are photographs showing the withdrawal plate of the paint withdrawal apparatus according to the present invention, and thus, FIG. 8A is a front perspective photograph, FIG. 8B is a rear perspective photograph, and FIG. 8C is a side photograph.

FIG. 9 is a partial enlarged photograph of the withdrawal plate of the paint withdrawal apparatus according to the present invention and FIG. 10 is a cross-sectional view of the withdrawal plate 90 of the paint withdrawal apparatus according to the present invention.

A feature of the paint withdrawal apparatus 100 according to the present invention compared with the previously filed invention is to replace the cover 75 in the rear of the metal-net filter plate 2 with the withdrawal plate 90.

As illustrated in FIGS. 6 and 7 with reference to FIG. 1, similarly to the filter plate 2, the withdrawal plate 90 is preferably installed in each of a rear surface of the filter plate 2 even on the side wall 3 and the bottom 5 in addition to the front wall 1 facing the paint spray nozzle 4. Moreover, when the withdrawal plate 90 of the present invention is installed on the rear surface of a innermost filter plate 2, the withdrawal plate 90 may be sufficiently covered with approximately one to two filter plates 2.

Now, when the configuration of the withdrawal plate 90 is described in detail with reference to FIGS. 8A to 10, first, the withdrawal plate 90 of the present invention as a structure similar to a louver installed in a window, etc., is a structure in which slats 94 are arranged at a predetermined interval within a square frame constituted by left and right side frames 91, and an upper frame 92 and a base frame 93. The frame may be a hollow square frame.

However, in this case, as illustrated in FIG. 8C, the left and right side frames 91 are made to be inclined slightly backward in a vertical direction (that is, the side frame 91 and a rear extension portion of the base frame 93 are made to form an angle '$\alpha$'), and the rear extension portion of the base frame 93 and the side frame are supported by a subsidiary frame 95.

In this case, the slat 94 is fixed to the left and right side frames 91 in an oblique state so that a front is lifted up and moves down in a rear direction when viewed from the side (that is, so that a slat body 94a forms an angel '$\beta$' with a horizontal surface), but may have a flat-plate shape in which multiple slats are consecutively arranged at a predetermined interval in a vertical direction, but preferably, a form in which an upper blade 94b and a lower blade 94c which are extended while forming a predetermined obtuse angle are provided on upper and lower sides of the a long plate-shaped slat body 94a is preferable, and a form of "]" is more preferable.

Therefore, as illustrated in FIG. 10, even when the paint is sprayed from the spray nozzle 4 at different angles (see arrows "A", "B", and "C" of FIG. 10), even though the paint is still sprayed in the arrow "A" direction, a function to prevent the paint from being misted while splashing upwards and re-reflected downwards and consequently sprayed and a function to withdraw the paint without loss of the paint (see the arrow "D" of FIG. 10) by flowing downwards.

Undescribed reference numeral '96' represents a connection ring used when holding or moving the withdrawal plate 90.

In respect to the angle $\beta$ of the slot body 94a, the slot body 94a is made to be inclined at an appropriate angle so as to prevent the paint from being misted while being re-reflected upwards after hitting the slat by considering a paint spray angle from the nozzle 4, the angle $\alpha$ of the side frame, etc.

More preferably, the angle of the slat body is variably adjustable, but to this end, the structure may be slightly complicated.

The withdrawal plate 9 may be singly used, but more preferably, the re-reflection of the paint may be prevented when the withdrawal plate 9 is used together with the metal-net filter plate 3.

As such, when a louver-shaped withdrawal plate 90 of the present invention is used, the problem of the related art that the paint is reflected and misted while splashing upwards may be prevented, and as a result, the number of filter plates 2 may also be reduced and furthermore, there is an additional advantage that as the paint is reflected downwards by the slat 94, the paint is easily withdrawn.

Consequently, more preferably, the paint withdrawal apparatus of the present invention is a paint withdrawal apparatus in which the withdrawal plate 90 used for withdrawing a paint sprayed in a liquid phase is disposed on the front wall 1, the withdrawal plate 90 includes the square frame constituted by the left and right side frames 91, the upper frame 92, and the base frame 93, and the slats 94 arranged at a predetermined interval within the square frame, the left and right side frames 91 facing each other are inclined backwards and forms an acute angle with the rear extension portion of the base frame 93, the slat 94 has a form including an oblique long plate-shaped slat body 94a, the upper blade 94b which is extended to the upper side of the slat body 94a and extended while forming the obtuse angle $\delta$ with the slat body 94a, and the lower blade 94c extended to the lower side of the slat body 94a, so that the front is lifted up and moves down in the rear direction when viewed from the side, and performs a function to allow the paint to be withdrawn to flow down directly downwards while preventing the paint from being misted while splashing upwards even though the paint is sprayed from the spray nozzle 4 at different angles.

Although the present invention has been hereinabove described in accordance with an exemplary embodiment of the present invention, a case where those skilled in the art to which the present invention pertains changes and modifies the present invention within the scope without departing from the technical spirit of the present invention is also included in the present invention, of course.

What is claimed is:

1. An apparatus for withdrawing a sprayed paint in which a withdrawal plate (90) for withdrawing a paint sprayed in a liquid phase is disposed on a front wall (1) of a filter plate, the withdrawal plate (90) comprising:

a square frame constituted by left and right side frames (91), an upper frame (92), and a base frame (93); and slats (94) arranged at a predetermined interval within the square frame, wherein the left and right side frames (91) facing each other are inclined backwards and form an acute angle (a) with a rear extension portion of the base frame (93), and wherein each slat of the slats (94) is fixed to the left and right side frames (91) in an oblique state from a vertical plane so that a front end of each slat of the slats (94) is higher than a back end of each slat of the slats (94) when viewed from a side thereof wherein the slats (94) are consecutively arranged at the predetermined interval in a vertical direction, wherein each slat of the slats (94) has a form including a slat body (94*a*) formed by a plate, an upper blade (94*b*) extending from an upper side of the slat body (94*a*), and a lower blade (94*c*) extending from a lower side of the slat body (94*a*), the slat body (94*a*) forming an acute angel ($\beta$) with a horizontal surface, and the upper blade (94*b*) forming an obtuse angle ($\delta$) with the plate of the slat body (94*a*), and wherein the slats (94) are configured to allow the paint to be withdrawn by flowing the paint directly downwards while preventing the paint from being misted during splashing upwards as the paint is sprayed from a spray nozzle (4) at different angles.

2. The apparatus of claim 1, wherein the withdrawal plate (90) is disposed on filter plates on a side wall (3) and a bottom (5) of the apparatus for withdrawing a sprayed paint.

\* \* \* \* \*